(12) United States Patent
Kurihashi

(10) Patent No.: US 12,091,034 B2
(45) Date of Patent: Sep. 17, 2024

(54) INFORMATION PRESENTATION DEVICE, INFORMATION PRESENTING METHOD AND NON-TRANSITORY RECORDING MEDIUM

(71) Applicant: TOYOTA JIDOSHA KABUSHIKI KAISHA, Toyota (JP)

(72) Inventor: Sui Kurihashi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 17/947,251

(22) Filed: Sep. 19, 2022

(65) Prior Publication Data

US 2023/0131924 A1    Apr. 27, 2023

(30) Foreign Application Priority Data

Oct. 27, 2021   (JP) ................. 2021-175875

(51) Int. Cl.
| | | |
|---|---|---|
| *B60W 40/04* | (2006.01) | |
| *B60W 30/165* | (2020.01) | |
| *B60W 30/18* | (2012.01) | |
| *B60W 40/10* | (2012.01) | |
| *B60W 50/14* | (2020.01) | |

(52) U.S. Cl.
CPC .......... *B60W 50/14* (2013.01); *B60W 30/165* (2013.01); *B60W 30/18163* (2013.01); *B60W 40/04* (2013.01); *B60W 40/1005* (2013.01); *B60W 2050/146* (2013.01); *B60W 2530/16* (2013.01); *B60W 2530/209* (2020.02)

(58) Field of Classification Search
None
See application file for complete search history.

(56) References Cited

U.S. PATENT DOCUMENTS

| | | | | |
|---|---|---|---|---|
| 2013/0080019 | A1* | 3/2013 | Isaji ................... | B60W 30/16 |
| | | | | 701/96 |
| 2020/0398841 | A1 | 12/2020 | Maeda et al. | |
| 2021/0309258 | A1* | 10/2021 | Okazaki ............ | B60W 60/0027 |
| 2022/0289240 | A1* | 9/2022 | Ucar ................... | G08G 1/163 |

FOREIGN PATENT DOCUMENTS

| | | |
|---|---|---|
| JP | 2009-248865 A | 10/2009 |
| JP | 2012-001042 A | 1/2012 |
| JP | 2017-211955 A | 11/2017 |
| JP | 2019-006280 A | 1/2019 |
| JP | 2021-070457 A | 5/2021 |
| WO | 2019/180875 A1 | 9/2019 |

\* cited by examiner

*Primary Examiner* — John F Mortell
(74) *Attorney, Agent, or Firm* — Oliff PLC

(57) ABSTRACT

An information presentation device includes a processor configured to (i) acquire vehicle information relating to a plurality of peripheral vehicles around an own vehicle, (ii) calculate an effect index representing an effect due to follow-up travel of traveling behind each of the plurality of peripheral vehicles based on the vehicle information for each of the plurality of peripheral vehicles, and (iii) cause an output device of the own vehicle to output position information and the effect index relating to at least a portion of the plurality of peripheral vehicles.

12 Claims, 11 Drawing Sheets

INFORMATION PRESENTATION DEVICE, INFORMATION PRESENTING METHOD AND NON-TRANSITORY RECORDING MEDIUM

FIELD

The present disclosure relates to an information presentation device, an information presenting method, and a non-transitory recording medium.

BACKGROUND

In order to reduce the amount of fuel or electric power required for running a vehicle, it is effective to reduce the air resistance during running. Conventionally, as a technique for reducing the air resistance at the time of running, it is known to perform a follow-up travel in which the vehicle is made to follow a preceding vehicle. In the follow-up travel, the air resistance acting on the vehicle traveling behind the preceding vehicle is reduced by the wind shielding effect of the preceding vehicle.

As an example of such a follow-up driving, it is known to perform platooning in which a plurality of vehicles travel in a platoon. In the driving support device described in Patent Document 1, the number of vehicles and the position of a group of vehicles traveling in a platoon in the peripheral area of an own vehicle including the range that cannot be visually recognized from the own vehicle are presented to the driver of the own vehicle. As a result, the driver of the own vehicle can determine a group of vehicles to which the own vehicle joins, considering the number of vehicles constituting the group.

CITATIONS LIST

Patent Literature

[PTL 1] Japanese Unexamined Patent Publication No. 2017-211955

SUMMARY

Technical Problem

However, even if the number of vehicles constituting the group is presented to the occupant of the vehicle, it is difficult for the occupant of the vehicle to appropriately grasp the benefit enjoyed due to the follow-up travel. Therefore, it is difficult for the occupant of the own vehicle to be motivated to carry out the follow-up travel.

In addition, the air resistance reduction effect due to the follow-up travel fluctuates according to the characteristics of the preceding vehicle. However, in the driving support device described in PTL 1, only the information on the group of vehicles during platooning is presented, and no information on the individual vehicles constituting the group of vehicles is presented. Therefore, it is difficult for the occupant of the own vehicle to select an appropriate preceding vehicle from the peripheral vehicles as a tracking target.

In view of the above problems, an object of the present disclosure is to urge the occupant of the own vehicle to perform the follow-up travel, and to facilitate the selection of the preceding vehicle to be followed.

Solution to Problem

The summary of the present disclosure is as follows.
(1) An information presentation device for presenting information for selecting a preceding vehicle as a tracking target of an own vehicle via an output device provided in the own vehicle, the information presentation device comprising: a processor configured to (i) acquire vehicle information relating to a plurality of peripheral vehicles around the own vehicle, (ii) calculate an effect index representing an effect due to follow-up travel of traveling behind each of the plurality of peripheral vehicles based on the vehicle information for each of the plurality of peripheral vehicles, and (iii) cause the output device to output position information and the effect index relating to at least a portion of the plurality of peripheral vehicles.
(2) The information presentation device described in above (1), wherein the effect index is a reduction degree of an air-resistance acting on the own vehicle by the own vehicle traveling directly behind each of the plurality of peripheral vehicles.
(3) The information presentation device described in above (1), wherein the effect index is a reduction degree of fuel consumption or power consumption in the own vehicle by the own vehicle traveling directly behind each of the plurality of peripheral vehicles.
(4) The information presentation device described in any one of above (1) to (3), wherein the processor is further configured to (a) select one preceding vehicle candidate from the plurality of peripheral vehicles, and (b) cause the output device to output the position information and the effect index relating to the preceding vehicle candidate.
(5) The information presentation device described in above (4), wherein the processor is configured to select, among the plurality of peripheral vehicles, a peripheral vehicle having a highest effect index as the preceding vehicle candidate.
(6) The information presentation device described in above (4) or (5), wherein the processor is configured to cause the output device to display the preceding vehicle candidate so that the preceding vehicle candidate is emphasized more than other ones of the plurality of peripheral vehicles on the output device.
(7) The information presentation device described in any one of above (1) to (3), wherein the processor is further configured to (a) select a plurality of preceding vehicle candidates from among the plurality of peripheral vehicles, (b) determine priorities of the plurality of preceding vehicle candidates, and (c) cause the output device to display the position information, the effect index, and the priority relating to each of the plurality of preceding vehicle candidates.
(8) The information presentation device described in above (7), wherein the processor is configured to determine the priorities of the plurality of preceding vehicle candidates so that the priority is higher as the effect index is higher.
(9) The information presentation device described in any one of above (4) to (8), wherein the processor is configured to cause the output device to output information for supporting a lane change by the own vehicle to a lane in which the preceding vehicle candidate is located.
(10) The information presentation device described in above (9), wherein the information for supporting the lane change includes information of a rear vehicle positioned rearward of the own vehicle in a lane after execution of the lane change.

(11) An information presenting method executed by a computer, the method including: (i) acquiring vehicle information relating to a plurality of peripheral vehicles around an own vehicle; (ii) calculating an effect index representing an effect due to follow-up travel of traveling behind each of the plurality of peripheral vehicles based on the vehicle information for each of the plurality of peripheral vehicles; and (iii) causing an output device provided in the own vehicle to output position information and the effect index relating to at least a portion of the plurality of peripheral vehicles.

(12) A non-transitory recording medium having recorded thereon a computer program for presenting information for selecting a preceding vehicle as a tracking target of an own vehicle via an output device provided in the own vehicle, the computer program causing a computer to: (i) acquire vehicle information relating to a plurality of peripheral vehicles around the own vehicle, (ii) calculate an effect index representing an effect due to follow-up travel of traveling behind each of the plurality of peripheral vehicles based on the vehicle information for each of the plurality of peripheral vehicles, and (iii) cause the output device to output position information and the effect index relating to at least a portion of the plurality of peripheral vehicles.

According to the present disclosure, it is possible to urge the occupant of the own vehicle to perform the follow-up travel, and to facilitate the selection of the preceding vehicle to be followed.

DESCRIPTION OF EMBODIMENTS

Figure 1:
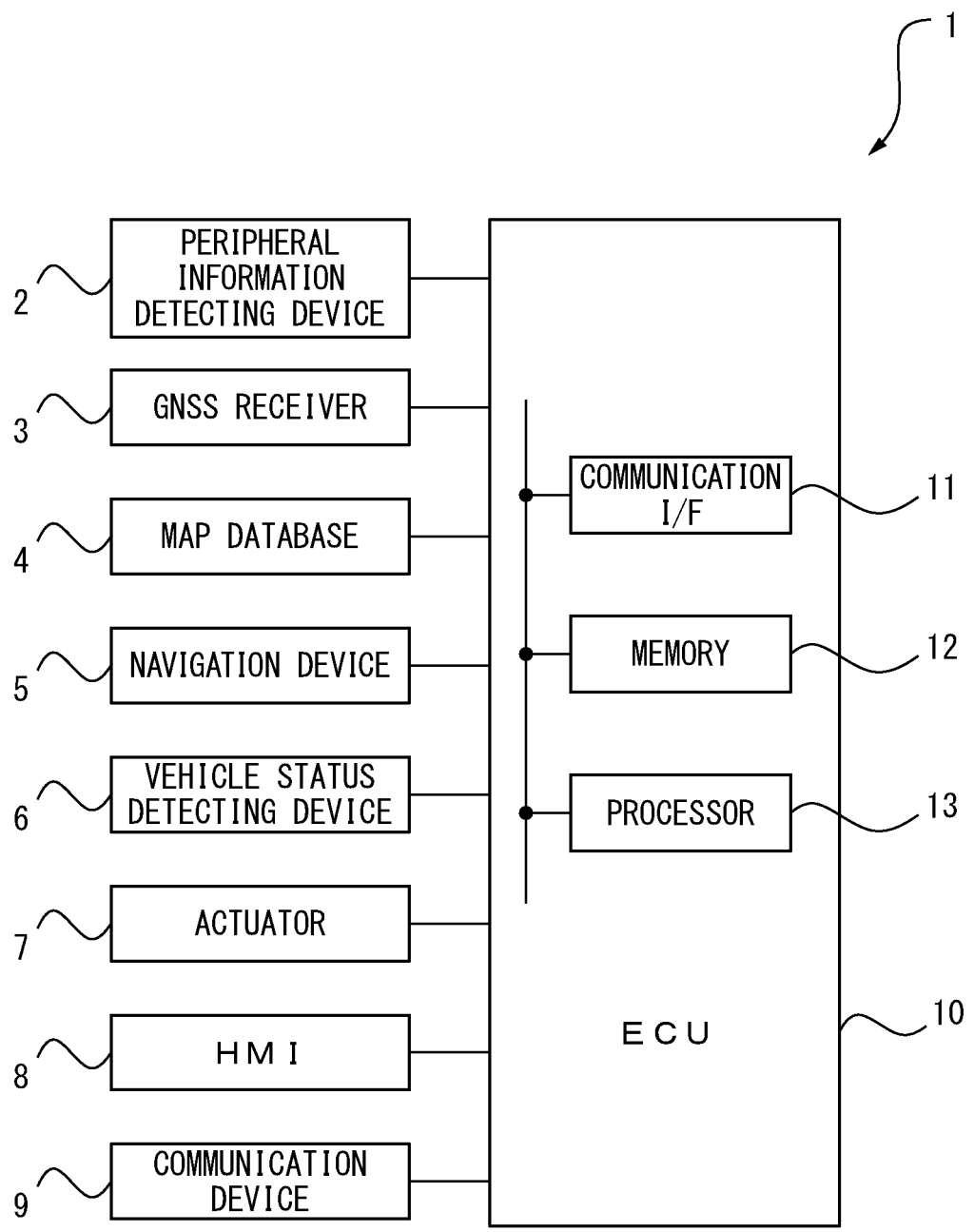
FIG. 1 is a schematic block diagram of a vehicle control system including an information presentation device according to a first embodiment of the present disclosure.

Hereinafter, embodiments of the present disclosure will be described in detail with reference to the drawings. In the following description, like components are denoted by the same reference numerals.

First Embodiment

Hereinafter, a first embodiment of the present disclosure will be described with reference to FIGS. 1 to 7.

FIG. 1 is a schematic block diagram of a vehicle control system 1 including an information presentation device according to a first embodiment of the present disclosure. Vehicle control system 1 is mounted on the vehicle, and executes various controls of the vehicle.

As shown in FIG. 1, the vehicle control system 1 includes a peripheral information detecting device 2, a GNSS receiver 3, a map database 4, a navigation device 5, a vehicle status detecting device 6, an actuator 7, a human machine interface (HMI: Human Machine Interface) 8, a communication device 9 and an electronic control unit (Electronic Control Unit (ECU)) 10. The peripheral information detecting device 2, the GNSS receiver 3, the map database 4, the navigation device 5, the vehicle condition detection device 6, the actuator 7, the HMI 8, and the communication device 9 are electrically connected to ECU 10 via an in-vehicle network conforming to the CAN (Controller Area Network) standard or the like.

Peripheral information detecting device 2 acquires data around the vehicle (own vehicle) (images, point group data, etc.), and detects the peripheral information of the vehicle (e.g., peripheral vehicles, lanes, etc.). For example, device 2 includes a millimeter wave radar, a camera (e.g., a stereo camera), a LIDAR: Laser Imaging Detection And Ranging, or an ultrasonic sensor (sonar), or any combination thereof. The peripheral information detected by the output of the peripheral information detection device 2, that is, the peripheral information of the vehicle detected by the peripheral information detection device 2 is transmitted to ECU 10.

GNSS receiver 3, based on the positioning information obtained from a plurality of (e.g., three or more) positioning satellites, detects the present position of the vehicle (e.g., latitude and longitude of the vehicle). Specifically, GNSS receiver 3 captures a plurality of positioning satellites and receives radio waves transmitted from the positioning satellites. Then, GNSS receiver 3 calculates the distance to the positioning satellite based on the difference between the transmission time and the reception time of the radio wave, and detects the present position of the vehicle based on the distance to the positioning satellite and the position of the positioning satellite (orbital information). The output of GNSS receiver 3, i.e., the present position of the vehicle detected by GNSS receiver 3, is transmitted to ECU 10.

The map database 4 stores map information. ECU 10 acquires map information from the map database 4. The map data base may be provided outside the vehicle, for example, in one or more servers, and ECU 10 may acquire map data from outside the vehicle.

The navigation device 5 sets a driving route of the vehicle to the destination based on the present position of the vehicle detected by GNSS receiver 3, map data in the map database 4, inputs by a vehicle occupant, for example, a driver, and the like. The driving route set by device 5 is transmitted to ECU 10.

Vehicle status detection device 6 detects the status quantity of the vehicle. The vehicle status detection device 6 includes, for example, a vehicle speed sensor for detecting the speed of the vehicle, a yaw rate sensor for detecting the yaw rate of the vehicle, and the like. The output of the vehicle status detection device 6, i.e., the status quantity of the vehicle detected by the vehicle status detection device 6, is transmitted to ECU 10.

The actuator 7 operates the vehicle. For example, actuator 7 includes a drive device (e.g., at least one of an internal combustion engine and an electric motor) for acceleration of a vehicle, a brake actuator for braking (deceleration) of the vehicle, and a steering motor for steering of the vehicle. ECU 10 controls the actuator 7 to control the behavior of the vehicle.

In the present embodiment, the vehicle control system 1 functions as an advanced driving support system (ADAS: Advanced Driving Assistant System), to operate a predetermined driving support function by controlling the actuator 7. The predetermined driving support function includes, for example, an adaptive cruise control (ACC: Adaptive Cruise Control) that automatically controls the speed of the vehicle according to the presence or absence of a preceding vehicle, lane keeping assist (LKA: Lane Keeping Assist) or lane tracing assist (LTA: Lane Tracing Assist) that automatically controls the steering of the vehicle so that the vehicle is maintained in the lane, and the like.

HMI 8 exchanges information between the vehicle and the occupants of the vehicle, e.g., drivers.

HMI 8 includes an output unit for outputting information to the occupant of the vehicle (e.g., a display, a speaker, a vibration unit, etc.), and an input unit (e.g., a touch panel, an operation button, an operation switch, a microphone, etc.) for inputting information by the occupant of the vehicle. The output of ECU 10 is notified to the occupant of the vehicle via HMI 8, and the input from the occupant of the vehicle is transmitted to ECU 10 via HMI 8. A HMI 8 is an instance of an input device, an output device, or an input/output device. Note that a portable terminal (smartphone, tablet terminal, or the like) of a vehicle occupant may be connected to ECU 10 by wire or wirelessly so as to be able to communicate with it, and may function as a HMI 8. HMI 8 may also be integral with the navigation device 5.

Communication device 9 is capable of communicating with the outside of the vehicle and allows communication between the vehicle and the outside of the vehicle. For example, the communication device 9 includes a wide area communication device (e.g., a data communication module (DCM: Data Communication Module)) that enables wide area communication between the vehicle and the outside (e.g., servers) of the vehicle via a communication network such as a carrier network or an Internet network, an inter-vehicle communication device that enables inter-vehicle communication between the vehicle and a peripheral vehicle using a predetermined frequency band, and a road-to-vehicle communication device that enables road-to-vehicle communication between the vehicle and a roadside system using a predetermined frequency band.

ECU 10 performs various control of vehicles. As shown in FIG. 1, ECU 10 includes a communication interface 11, a memory 12, and a processor 13. The communication interface 11 and memory 12 are connected to the processor 13 via signal lines. Although one ECU 10 is provided in the present embodiment, a plurality of ECUs may be provided for each function.

The communication interface 11 has interface circuits for connecting ECU 10 to in-vehicle networks. ECU 10 is connected to other in-vehicle devices via the communication interface 11.

The communication interface 11 is an exemplary communication unit of ECU 10.

The memory 12 includes, for example, a volatile semiconductor memory and a nonvolatile semiconductor memory. The memory 12 stores computer programs, data, and the like, which are used when various processes are executed by the processor 13.

The processor 13 includes one or a plurality of CPUs (Central Processing Unit) and peripheral circuits thereof. The processor 13 may further include an arithmetic circuit such as a logical arithmetic unit or a numerical arithmetic unit.

Incidentally, in order to reduce the amount of fuel or power consumption required for the running of the vehicle, it is effective to reduce the air resistance during running. Conventionally, as a technique for reducing the air resistance at the time of running, it is known to perform a follow-up travel in which the vehicle is made to follow a preceding vehicle. In the follow-up travel, the air resistance acting on the vehicle traveling behind the preceding vehicle is reduced by the wind shielding effect of the preceding vehicle. Note that platooning in which a plurality of vehicles travel in a platoon is one example of follow-up travel.

Figure 2:
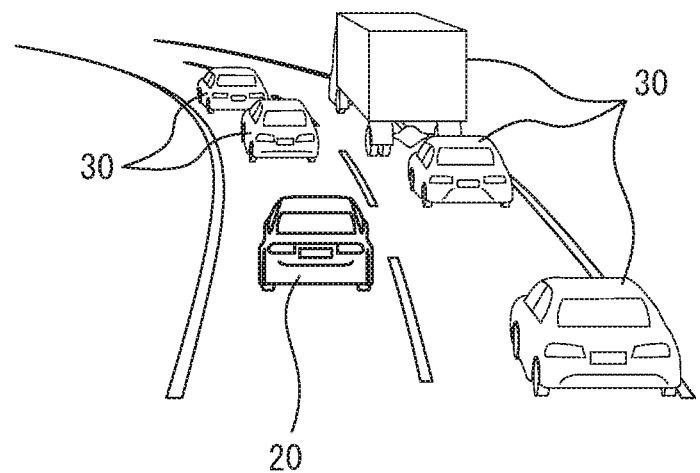
FIG. 2 is a diagram showing an example of a scene in which a plurality of vehicles are traveling on an automobile-only road.

FIG. 2 is a diagram showing an example of a scene in which a plurality of vehicles are traveling on an automobile-only road. In the example of FIG. 2, five peripheral vehicles 30 are traveling around the vehicle 20. Further, in the range that is not visible from the own vehicle 20, there may be a peripheral vehicle becoming a candidate of the tracking target. When starting the follow-up travel in such a situation, it is necessary to select a preceding vehicle as the tracking target of the own vehicle from the peripheral vehicles. At this time, it is desirable that an indicator for selecting a suitable preceding vehicle for an occupant (e.g., a driver) of the vehicle is presented.

Therefore, in the present embodiment, the information presentation device presents information for selecting a preceding vehicle to be tracked by the own vehicle through the output device provided in the own vehicle. In the present embodiment, ECU 10 functions as an information presentation device, and HMI 8 functions as an output device.

Figure 3:
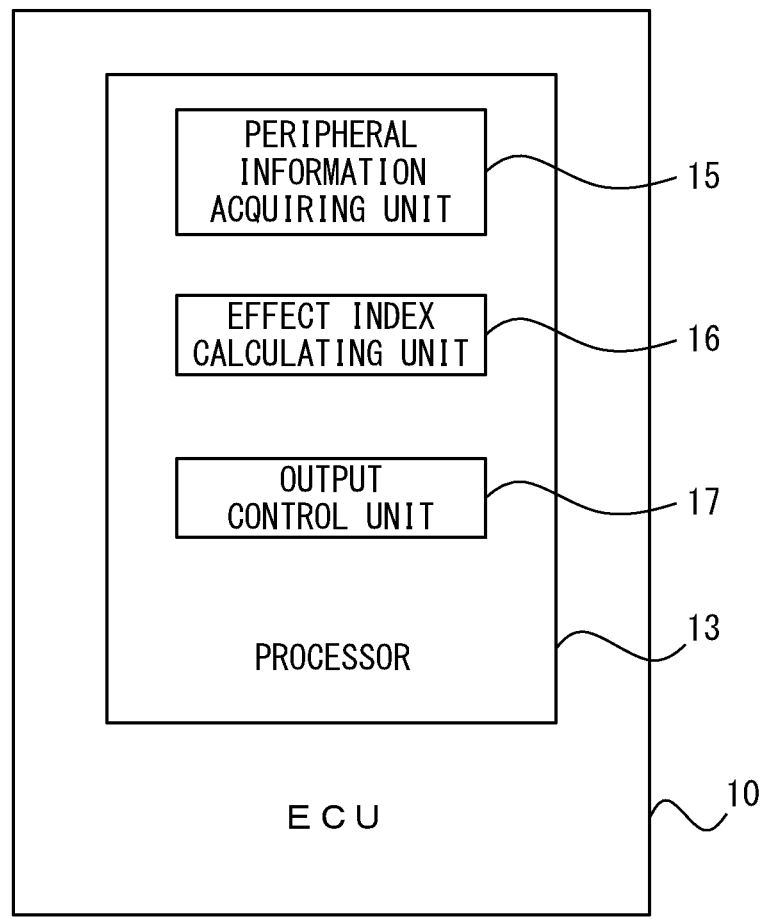
FIG. 3 is a functional block diagram of a processor of the ECU.

FIG. 3 is a functional diagram of the processor 13 of ECU 10. In the present embodiment, the processor 13 includes a peripheral information acquiring unit 15, an effect index calculating unit 16, and an output control unit 17. The peripheral information acquiring unit 15, the effect index calculating unit 16, and the output control unit 17 are functional modules realized by ECU 10 processor 13 executing computer programs stored in the memory 12 of ECU 10. Each of these functional modules may be realized by a dedicated arithmetic circuit provided in the processor 13.

Peripheral information acquiring unit 15 acquires vehicle information relating to a plurality of peripheral vehicles around the own vehicle. For example, the peripheral information acquiring unit 15 acquires vehicle information from each of a plurality of peripheral vehicles around its own vehicle via inter-vehicle communication.

Effect index calculating unit 16, for each of the plurality of peripheral vehicles, based on the vehicle information relating to the peripheral vehicle, calculates an effect index representing the effect due to follow-up travel of the peripheral vehicle. As described above, when the own vehicle performs follow-up travel, the air resistance acting on the own vehicle is reduced.

Therefore, for example, the effect index calculating unit 16, as an effect index, calculates the reduction degree of the air resistance acting on the own vehicle when traveling behind the peripheral vehicle.

The output control unit 17 controls the output of HMI 8 and presents information to the occupant of the own vehicle through HMI 8. In the present embodiment, as an index for the occupant of the vehicle to select the preceding vehicle, the position information and the effect index relating to the peripheral vehicle are presented to the occupant of the vehicle. That is, the output control unit 17 makes HMI 8 output the position information and the effect index relating to the peripheral vehicles. By presenting an effect index for the peripheral vehicle, the benefit enjoyed by the follow-up travel can be suggested to the occupant of the own vehicle, thus encouraging the occupant of the own vehicle to perform the follow-up travel. It is also possible to facilitate the selection of the preceding vehicle by the occupant of the own vehicle by presenting the position information and the effect index with respect to the peripheral vehicle. Therefore, according to the present embodiment, it is possible to urge the occupant of the own vehicle to perform the follow-up travel and to facilitate the selection of the preceding vehicle as the follow-up target.

Further, when the position information and the effect index relating to a large number of peripheral vehicles around the own vehicle are presented, the amount of information becomes excessive, and it becomes difficult for the driver of the own vehicle to select the preceding vehicle while performing the driving operation. Therefore, in the present embodiment, the output control unit 17 selects one preceding vehicle candidate from the plurality of peripheral vehicles in which the vehicle information is acquired by the peripheral information acquiring unit 15, and outputs the position information and the effect index relating to the preceding vehicle candidate to HMI 8. This makes the selection of the preceding vehicle by the driver of the own vehicle easier.

For example, the output control unit 17, among the plurality of peripheral vehicles in which the vehicle information is acquired by the peripheral information acquiring unit 15, selects the peripheral vehicle having the highest effect index as the preceding vehicle candidate. By this, it is possible to urge the occupant of the own vehicle to follow the peripheral vehicle having the highest effect index, and it is possible to enhance the effect due to the follow-up travel.

Further, in the present embodiment, the output control unit 17 causes HMI 8 to display the preceding vehicle candidate so that the preceding vehicle candidate is emphasized more than the other peripheral vehicles on HMI 8. This allows the occupant of the own vehicle, especially the driver of the own vehicle, to recognize the position of the preceding vehicle candidate quickly.

Figure 4:
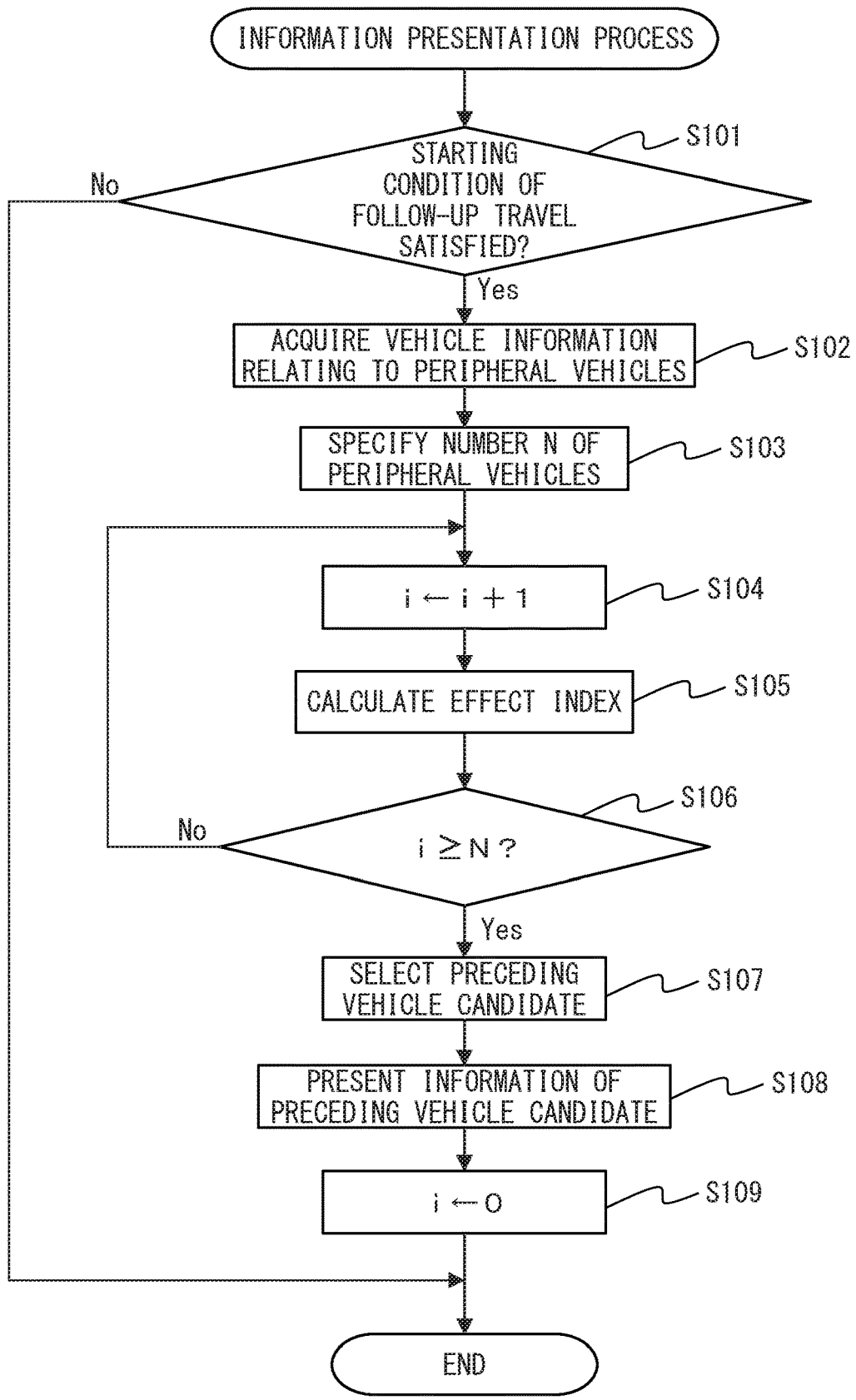
FIG. 4 is a flowchart showing a control routine of the information presentation process according to the first embodiment.

Hereinafter, the control flow of the above-described processing will be described in detail with reference to FIG. 4. FIG. 4 is a flowchart showing a control routine of the information presentation process according to the first embodiment. The control routine is repeatedly executed at predetermined intervals by ECU 10 processor 13.

First, in step S101, the output control unit 17 determines whether the starting condition of the follow-up travel is satisfied. The starting condition of the follow-up travel is predetermined, and is satisfied, for example, when the occupant of the vehicle requests the operation of the ACC or the start of the follow-up travel via HMI 8. Incidentally, the starting condition of the follow-up travel may be that the vehicle is traveling on an automobile exclusive road at a speed equal to or higher than a predetermined value or the like. If it is determined in step S101 that the starting condition of the follow-up travel is not satisfied, the control routine ends.

On the other hand, if it is determined in step S101 that the starting condition of the follow-up travel is satisfied, the control routine proceeds to step S102. In step S102, the peripheral information acquiring unit 15 acquires the vehicle information relating to a plurality of peripheral vehicles around the own vehicle via the vehicle-to-vehicle communication. Specifically, the peripheral information acquiring unit 15 acquires the vehicle information via the vehicle-to-vehicle communication from each of the plurality of peripheral vehicles located within the communication range of the vehicle-to-vehicle communication. In the present embodiment, as the vehicle information relating to the peripheral vehicle, the position of the peripheral vehicle, the vehicle width and the vehicle length of the peripheral vehicle or the like is transmitted from the peripheral vehicle to the own vehicle.

Next, in step S103, the effect index calculating unit 16 specifies the number N of peripheral vehicles in which the vehicle information is acquired by the peripheral information acquiring unit 15, and assigns the vehicle number (1 to N) to each of the N peripheral vehicles.

Next, in step S104, the effect index calculating unit 16 updates the vehicle number i by adding 1 to the vehicle number i. Incidentally, the initial value of the vehicle number i when the ignition switch of the own vehicle is turned on is zero.

Then, in step S105, the effect index calculator 16 calculates the effect index relating to the i-th peripheral vehicle based on the vehicle information relating to the i-th peripheral vehicle. Specifically, the effect index calculating unit 16, as the effect index, calculates the reduction degree of the air resistance acting on the own vehicle following behind the i-th peripheral vehicle. The greater the reduction degree in air resistance, the smaller the air resistance acting on the own vehicle when the own vehicle follows the peripheral vehicle as compared to the air resistance acting on the own vehicle when the own vehicle travels alone.

For example, the effect index calculating unit 16 calculates an estimated value of the forward projected area of the peripheral vehicle based on the vehicle width and the vehicle length of the peripheral vehicle, and calculates the reduction degree of the air resistance based on the estimated value. In this case, the greater the estimate of the forward projected area, the greater the reduction degree of air resistance. Incidentally, the vehicle width and the vehicle height of the peripheral vehicle via the vehicle-to-vehicle communication may be transmitted to the own vehicle and the front projection area may be calculated by multiplying the vehicle height by the vehicle width, or the front projection area of the peripheral vehicle via the vehicle-to-vehicle communication may be transmitted to the own vehicle. In these cases, the larger the forward projection area, the greater the reduction degree in air resistance.

Further, when the air resistance coefficient of the peripheral vehicle via the vehicle-to-vehicle communication (Cd value) is transmitted to the own vehicle, the effect index calculating unit 16 may calculate the reduction degree of the air resistance based on the Cd value. In this case, the greater the Cd value, the more that the reduction degree of air resistance is increased.

Next, in step S106, the effect index calculating unit 16 determines whether or not the vehicle number i is equal to or greater than N. If it is determined that the vehicle number i is less than N, the control routine returns to step S104, and steps S104 and S105 are performed again to calculate the effect index for another peripheral vehicle.

On the other hand, if it is determined in step S106 that the vehicle number i is equal to or greater than N, the control routine proceeds to step S107. In step S107, the output control unit 17 selects the peripheral vehicle having the highest effect index, that is, the peripheral vehicle having the largest reduction degree of the air resistance acting on the own vehicle, as the preceding vehicle candidate.

Incidentally, the output control unit 17 may select the preceding vehicle candidate based on other determination criteria. For example, the output control unit 17 may select as the preceding vehicle candidate, among the peripheral vehicles having an effect index equal to or higher than a predetermined value, the peripheral vehicle in which the vehicle-to-vehicle distance between the own vehicle is shortest. Further, the output control unit 17 may select as the preceding vehicle candidate, among the peripheral vehicles in which the vehicle-to-vehicle distance between the own vehicle is equal to or less than a predetermined value or the peripheral vehicles located in front of the own vehicle, the peripheral vehicle having the highest effect index.

Then, in step S108, the output control unit 17 presents the information of the preceding vehicle candidate to the occupant (e.g., the driver) of the own vehicle through HMI 8. Specifically, the output control unit 17 causes HMI 8 to output the position information and the effect index relating to the preceding vehicle candidate. For example, the output control unit 17 presents image information including the information of the preceding vehicle candidate to the occupant of the own vehicle in order to provide visual information to the occupant of the own vehicle. That is, the output control unit 17 causes the HMI 8 to display the position information and the effect index relating to the preceding vehicle candidate.

Figure 5:
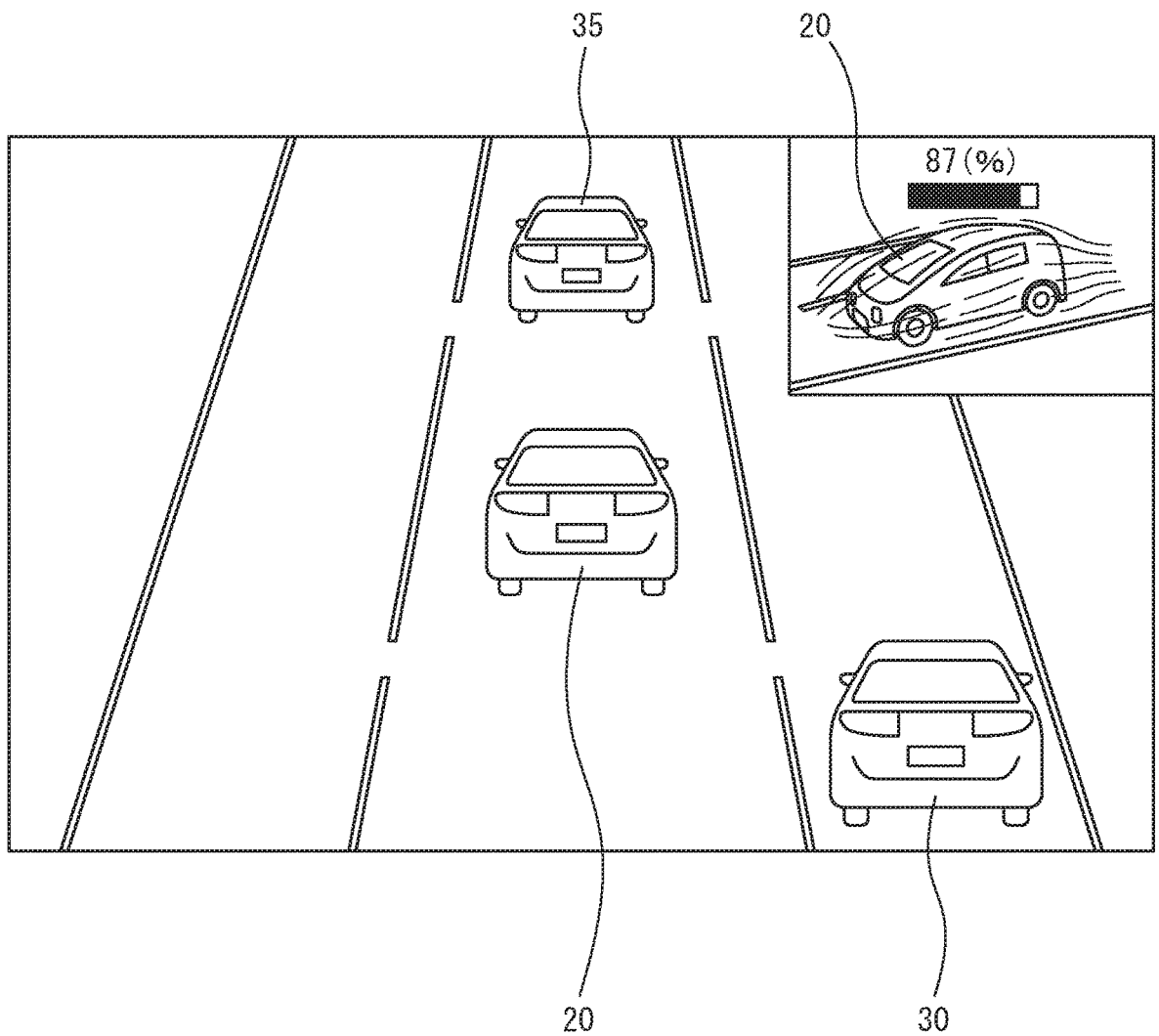
FIG. 5 is a diagram showing an example of a screen on which information of preceding vehicle candidates is displayed.

FIG. 5 is a diagram showing an example of a screen on which information of a preceding vehicle candidate is displayed. In the example of FIG. 5, an image when the own vehicle 20 is viewed from the rear obliquely upward is displayed, and the own vehicle 20, the preceding vehicle candidate 35, and other peripheral vehicles 30 are displayed as vehicle icons. In this example, the preceding vehicle candidate 35 is located in front of the vehicle 20, and the relative positional relationship of the preceding vehicle candidate 35 with respect to the vehicle 20 is shown as positional information about the preceding vehicle candidate 35.

In addition, in the example of FIG. 5, together with a schematic diagram of the own vehicle 20 receiving air resistance, the reduction degree of air resistance acting on the own vehicle 20 is shown as an effect index relating to the preceding vehicle candidate 35. In this example, the ratio of the air resistance acting on the own vehicle 20 when the own vehicle 20 follows the preceding vehicle candidate 35 with respect to the air resistance acting on the own vehicle 20 when the own vehicle 20 independently travels is 87%, and the reduction degree of the air resistance becomes 13%.

The effect index relating to the preceding vehicle candidate 35 may be a reduction degree of fuel consumption or power consumption by the own vehicle 20. If the own vehicle 20 is a vehicle powered by fuel (gasoline, diesel, fuel cell vehicle (FCEV), etc.), the greater the reduction degree of air drag, the greater the reduction degree of fuel consumption. If the own vehicle 20 is a vehicle powered by electric power (plug-in hybrid vehicle (PHEV), electric vehicle (BEV), etc.), the greater the reduction degree of air-resistance, the greater the reduction degree of power consumption.

The output control unit 17 also causes HMI 8 to display the preceding vehicle candidate 35 so that the preceding vehicle candidate 35 is more emphasized on HMI 8 than the other peripheral vehicles 30. For example, the output control unit 17 displays the preceding vehicle candidate 35 in a display mode different from the other peripheral vehicles 30 (e.g., transparency, brightness, color (hue), lightness of color, saturation of color, etc.). As a specific example, the transparency of the preceding vehicle candidate 35 is made lower than the transparency of the other peripheral vehicles 30, or the brightness, color lightness, or color saturation of the preceding vehicle candidate 35 is made higher than that of the other peripheral vehicles 30. In addition, the color of the preceding vehicle candidates 35 may be set to a color different from the background color of HMI 8 display, and the color of the other peripheral vehicles 30 may be set to the same color as the background color of HMI 8 display (for example, when the background color is blue, the colors of the other peripheral vehicles 30 are light blue). Alternatively, the preceding vehicle candidate 35 may be surrounded by a circle, a rectangle, or the like, or an arrow directed to the preceding vehicle candidate 35 may be displayed.

Figure 6:
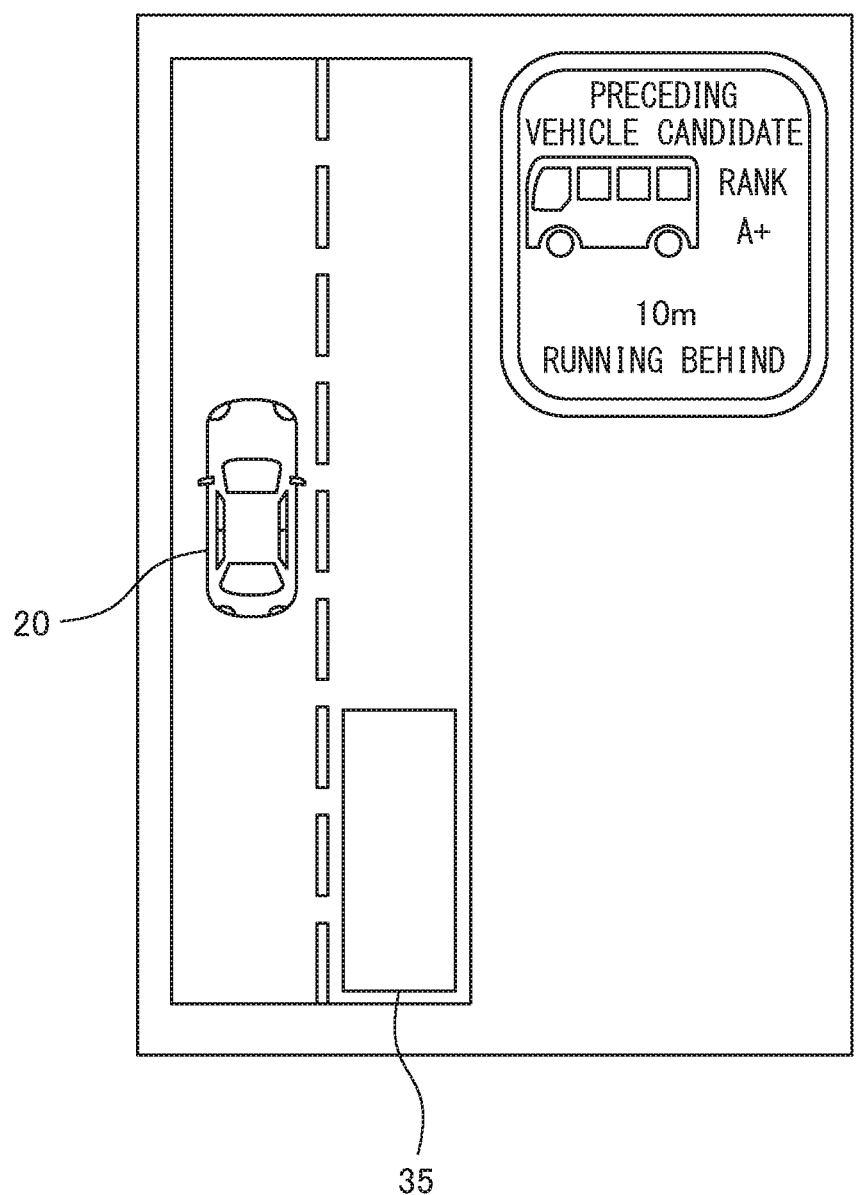
FIG. 6 is a diagram showing another example of a screen on which information of preceding vehicle candidates is displayed.

FIG. 6 is a diagram showing another example of a screen on which information of preceding vehicle candidates is displayed. In the example of FIG. 6, an image when the own vehicle 20 is viewed from above is displayed, and only the own vehicle 20 and the preceding vehicle candidate 35 are displayed as the vehicle icon. In this example, the preceding vehicle candidate 35 is positioned behind the own vehicle 20, and as the positional information relating to the preceding vehicle candidate 35, the direction of the preceding vehicle candidate 35 relative to the own vehicle 20 (in this example, the rear) and the vehicle-to-vehicle distance between the own vehicle 20 and the preceding vehicle candidate 35 (in this example, 10 m) are shown together with the relative positional relationship of the preceding vehicle candidate 35 with respect to the own vehicle 20.

Further, in the example of FIG. 6, as the effect index relating to the preceding vehicle candidate 35, a rank indicating the magnitude of the effect due to the follow-up travel is shown. For example, A+ to C− are used as the rank. In this case, when the rank is A+, the effect due to the follow-up travel (e.g., the reduction degree of air resistance or the reduction degree of fuel consumption or power consumption) becomes the largest, and when the rank is C−, the effect due to the follow-up travel becomes the smallest.

Incidentally, the output control unit 17 may present the voice information including the information of the preceding vehicle candidate to the occupant of the own vehicle in order to provide auditory information to the occupant of the own vehicle. In this case, the output control unit 17 causes HMI 8 to output the position information and the effect index relating to the preceding vehicle candidates by voice.

Then, in step S109, the output control unit 17 resets the vehicle number i to zero. After step S109, the control routine ends. The calculation for calculating the effect index for each of the plurality of peripheral vehicles, that is, the process of the step S105 may be performed in parallel.

Further, in the step S102, the peripheral information acquiring unit 15, based on the output of the peripheral information detecting device 2, may acquire vehicle information relating to a plurality of peripheral vehicles around the vehicle. In this case, for example, as information about the peripheral vehicle, the position of the peripheral vehicle, the vehicle width and the vehicle height, etc. of the peripheral vehicle is acquired.

In addition, when the preceding vehicle candidate is located in a lane different from the own vehicle, it is necessary for the own vehicle to change the lane to the lane where the preceding vehicle candidate is located in order to start the follow-up travel of the preceding vehicle candidate. Therefore, the output control unit 17 may cause HMI 8 to output information for supporting the lane change to the lane where the preceding vehicle candidate is located. This makes it easy to realize a smooth lane change for the follow-up travel of the preceding vehicle candidate.

Information for assisting lane change includes, for example, information indicating the timing and direction of the lane change and information of the rear vehicle located behind the own vehicle in the lane after the lane change. By presenting the information of the rear vehicle to the occupant of the own vehicle, it is possible to facilitate the peripheral confirmation at the time of lane change by the occupant of the vehicle.

Figure 7:
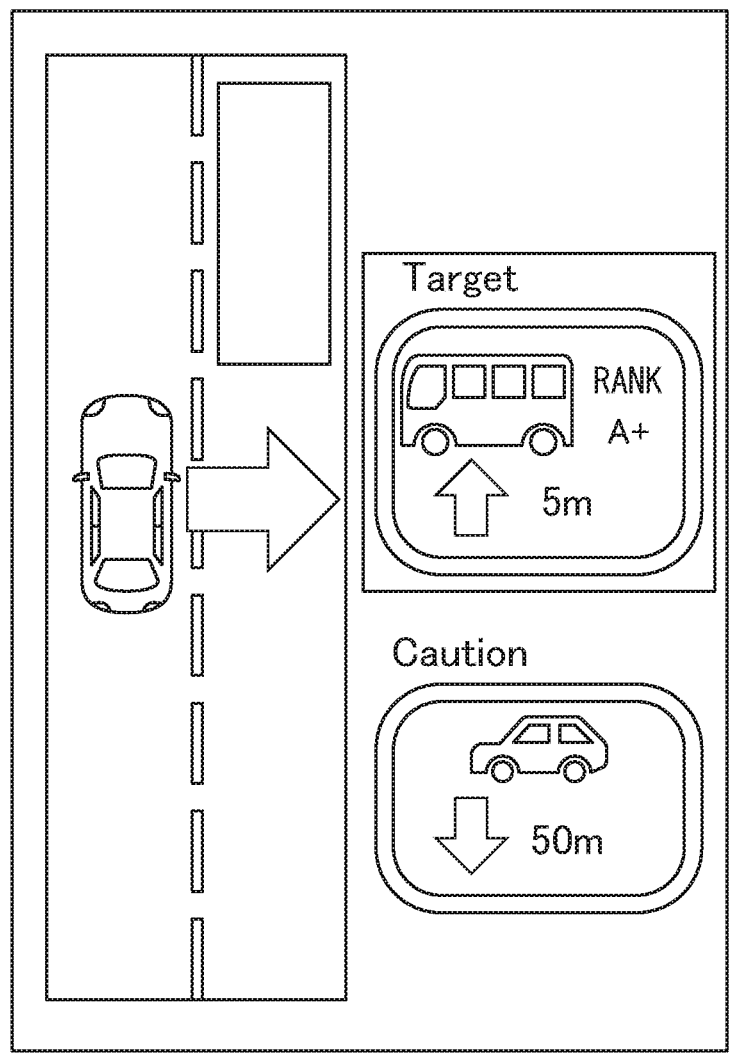
FIG. 7 is a diagram illustrating an example of a screen on which information for assisting lane change to a lane where a preceding vehicle candidate is located is displayed.

FIG. 7 is a diagram illustrating an example of a screen on which information for assisting lane change to a lane where a preceding vehicle candidate is located is displayed. In the example of FIG. 7, as information indicating the timing and direction of lane change, an arrow indicating the direction of lane change is displayed at the timing when the preceding vehicle candidate 35 is positioned in front of the own vehicle 20. Further, the vehicle icon of the rear vehicle as the information of the rear vehicle and the vehicle distance between the own vehicle 20 and the rear vehicle (50 m in this example) is displayed.

The information for supporting the lane change may be voice information. The information to assist in lane change may also be a vibration indicative of the timing and orientation of the lane change. In this case, the output control unit 17 vibrates the right half of the steering wheel of the own vehicle using the vibration unit of the HMI 8, for example, when the preceding vehicle candidate traveling in the right lane of the own vehicle is positioned in front of the own vehicle.

In addition, the actuator 7 may be automatically controlled such that the own vehicle follows the preceding vehicle candidate when the follow-up travel to the preceding vehicle candidate is approved by an input operation (switch operation, touch input, voice input, or the like) by the occupant of the own vehicle or when the follow-up travel of the preceding vehicle candidate is not canceled by the occupant of the own vehicle. That is, the follow-up travel of the preceding vehicle candidate may be started by the automatic driving that does not require manual operation by the driver of the own vehicle.

Second Embodiment

The configuration and control of the vehicle control system according to the second embodiment are basically the same as the configuration and control of the vehicle control system according to the first embodiment, except for the points described below. Therefore, the second embodiment of the present disclosure will be described below focusing on portions different from the first embodiment.

As described above, in the first embodiment, one preceding vehicle candidate is selected, and information of the selected preceding vehicle candidate is presented to the occupant of the own vehicle. On the other hand, when the occupant of the own vehicle is capable of processing many pieces of information, for example, when the own vehicle is an automatic driving vehicle in which all of acceleration, steering, and deceleration (braking) of the vehicle are automatically executed, there is a need to present a plurality of preceding vehicle candidates to the occupant of the own vehicle. However, even in this case, it is desirable to provide an indicator for selecting a preceding vehicle from among a plurality of preceding vehicle candidates.

Therefore, in the second embodiment, the output control unit 17 selects a plurality of preceding vehicle candidates from the plurality of peripheral vehicles in which the vehicle information is acquired by the peripheral information acquiring unit 15, determines priorities of the plurality of preceding vehicle candidates, and causes the HMI 8 to display the position information, the effect index, and the priority relating to each of the plurality of preceding vehicle candidates. This makes it possible for the occupant of the own vehicle to determine the preceding vehicle in consideration of the priorities determined by the system and the occupant own preferences.

Further, the output control unit 17 determines the priorities of a plurality of preceding vehicle candidates so that the higher the effect index, the higher the priority. By this, it is possible to urge the occupant of the vehicle to follow-up travel behind the peripheral vehicle having the highest effect index, and it is possible to enhance the effect due to the follow-up travel.

Figure 8:
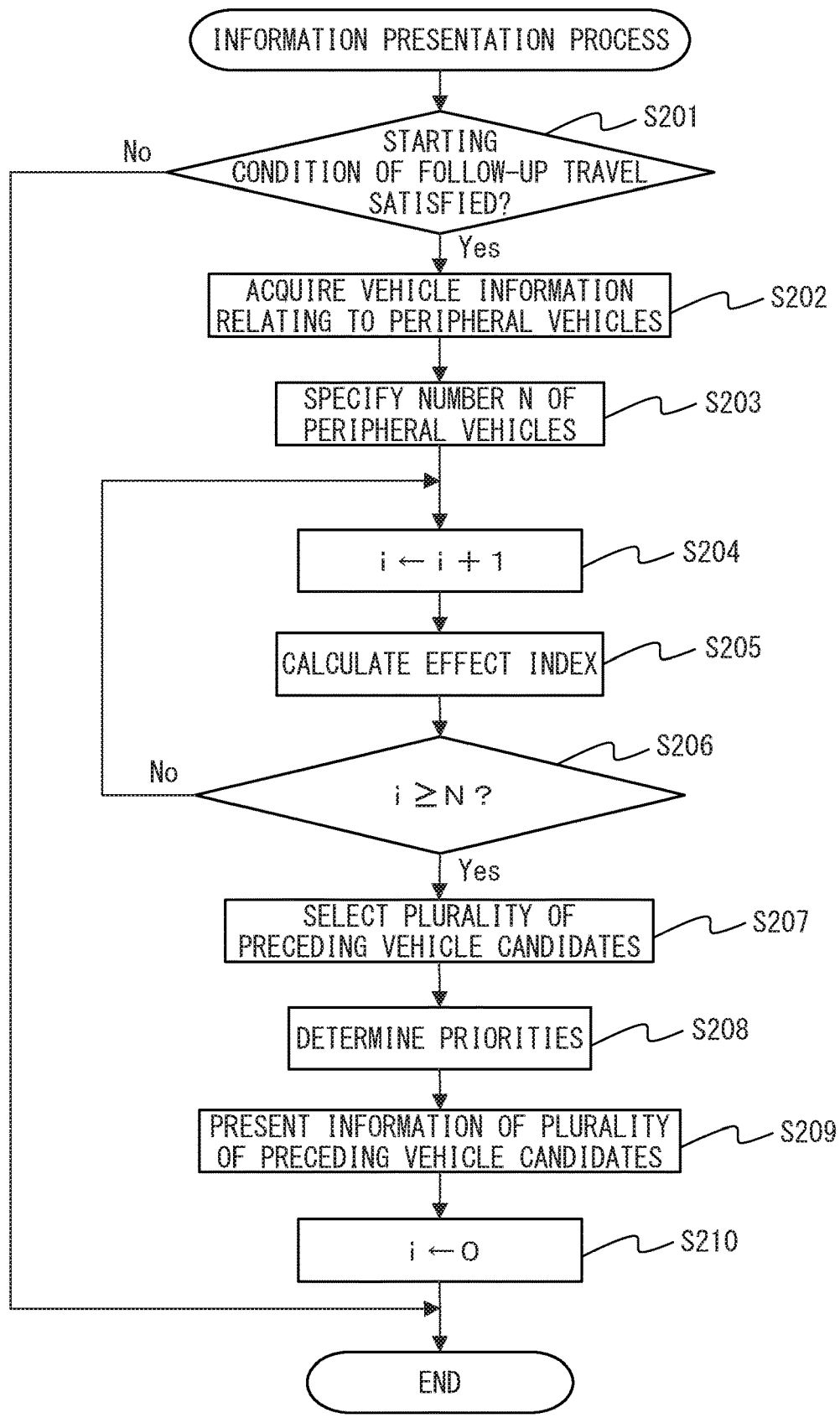
FIG. 8 is a flowchart showing a control routine of the information presentation process according to a second embodiment.

FIG. 8 is a flowchart showing a control routine of the information presentation process in the second embodiment. The control routine is repeatedly executed at predetermined intervals by ECU 10 processor 13.

The steps S201-S206 are executed in the same manner as the steps S101-S106 of FIG. 4. If it is determined in step S206 that the vehicle number i is equal to or greater than N, the control routine proceeds to step S207.

In step S207, the output control unit 17 selects a plurality (for example, 2 to 4) of the preceding vehicle candidates among the N peripheral vehicles in the order in which the effect index is higher. The output control unit 17 may select a plurality of preceding vehicle candidates based on other determination criteria. For example, the output control unit 17 may select a plurality of preceding vehicle candidates in the order of closeness to the own vehicle based on the vehicle-to-vehicle distance with the own vehicle. Further, the output control unit 17, among the peripheral vehicles located in front of the vehicle, may select a plurality of preceding vehicle candidates in order of effect index.

Next, in step S208, the output control unit 17 determines priorities of a plurality of preceding vehicle candidates. For example, the output control unit 17 determines the priority of a plurality of preceding vehicle candidates so that the higher the effect index, the higher the priority. That is, the priority of the preceding vehicle candidate having the highest effect index is set to the highest.

Then, in step S209, the output control unit 17 presents information of a plurality of preceding vehicle candidates to an occupant (e.g., a driver) of the own vehicle through HMI 8. Specifically, the output control unit 17 causes HMI 8 to display the position information, the effect index, and the priority relating to the plurality of preceding vehicle candidates.

Figure 9:
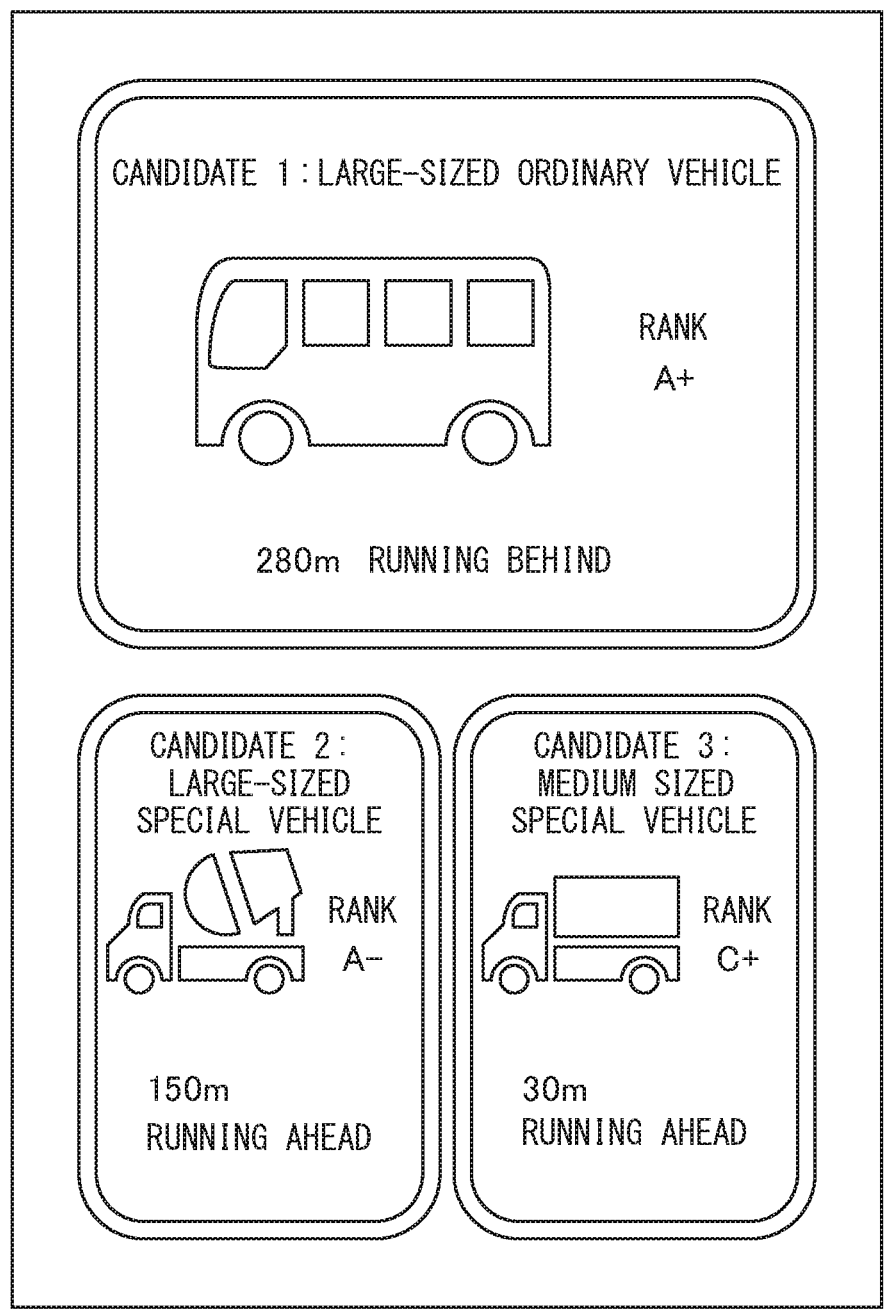
FIG. 9 is a diagram showing an example of a screen on which information of a plurality of preceding vehicle candidates is displayed.

FIG. 9 is a diagram showing an example of a screen on which information of a plurality of preceding vehicle candidates is displayed. In the example of FIG. 9, for each of the three preceding vehicle candidates, the direction (forward or backward) of the preceding vehicle candidate relative to the own vehicle and the vehicle-to-vehicle distance between the own vehicle and the preceding vehicle candidate are shown as the position information, and the rank (A+ to C−) is shown as the effect index. In this example, the priority is represented by the rank order, the preceding vehicle candidate having the highest priority is displayed as the candidate 1, and the preceding vehicle candidate having the lowest priority is displayed as the candidate 3. Further, in this example, for each of the three preceding vehicle candidates, a vehicle icon and character information representing the vehicle type (large-sized ordinary vehicle, large-sized special vehicle, and medium-sized special vehicle) are displayed.

Next, in step S210, the output control unit 17 resets the vehicular number i to zero. After step S210, the control routine ends. The calculation for calculating the effect index for each of the plurality of peripheral vehicles, that is, the process of the step S205 may be performed in parallel.

Further, in the step S202, the peripheral information acquiring unit 15, based on the output of the peripheral information detecting device 2, may acquire vehicle information relating to a plurality of peripheral vehicles around the vehicle. In this case, for example, as information about the peripheral vehicle, the position of the peripheral vehicle, the vehicle width and the vehicle height, etc. of the peripheral vehicle is acquired.

Further, when one preceding vehicle candidate is selected from among a plurality of preceding vehicle candidates by an input operation (a switch operation, a touch input, a voice input, or the like) by an occupant of the own vehicle, similarly to the first embodiment, the output control unit 17 may cause HMI 8 to output information for assisting the lane change to the lane where the preceding vehicle candidate is located. In addition, when one preceding vehicle candidate is selected from among a plurality of preceding vehicle candidates by an input operation by an occupant of the own vehicle, the actuator 7 may be automatically controlled so that the own vehicle follows the preceding vehicle candidate as in the first embodiment.

Third Embodiment

The configuration and control of the vehicle control system according to the third embodiment are basically the same as the configuration and control of the vehicle control system according to the first embodiment, except for the points described below. Therefore, the third embodiment of the present disclosure will be described below focusing on portions different from the first embodiment.

Figure 10:
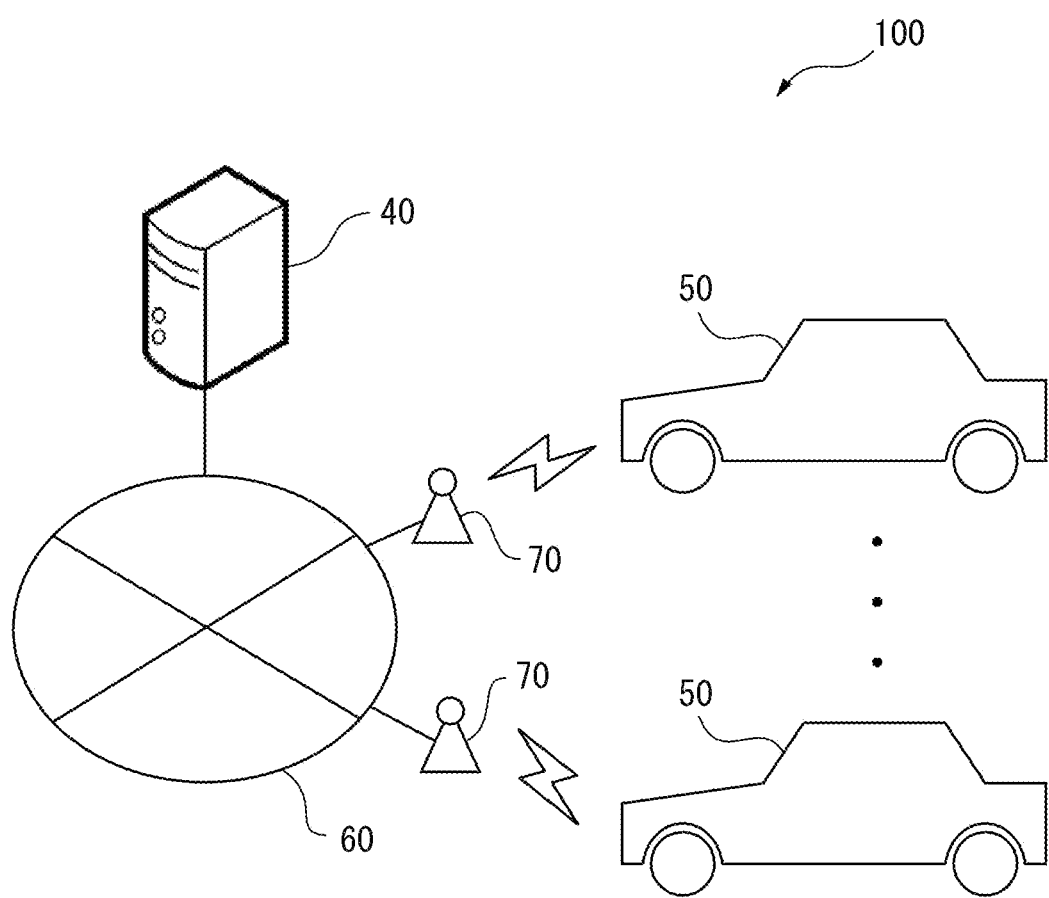
FIG. 10 is a schematic configuration diagram of a client-server system including an information-presenting device according to a third embodiment of the present disclosure.

FIG. 10 is a schematic block diagram of a client-server system 100 including an information-presenting device according to a third embodiment of the present disclosure. The client-server system 100 includes a server 40 and a plurality of vehicles 50. The server 40 can communicate with each of the plurality of vehicles 50 via a communication network 60 and a radio base station 70. The plurality of vehicles 50 includes an own vehicle that requests a follow-up travel of the preceding vehicle and peripheral vehicles around the own vehicle.

Figure 11:
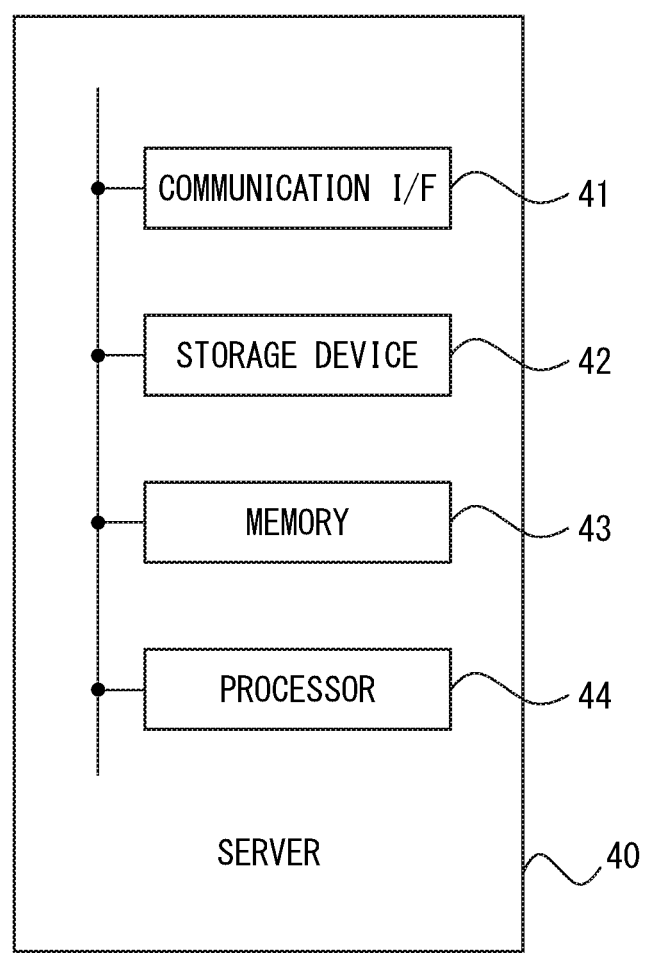
FIG. 11 is a diagram schematically showing a configuration of a server.

FIG. 11 is a diagram schematically showing the configuration of the server 40. The server 40 includes a communication interface 41, a storage device 42, a memory 43, and a processor 44.

The communication interface 41, storage device 42 and memory 43 are connected to the processor 44 via signal lines. The server 40 may further include an input device such as a keyboard and a mouse, an output device such as a display, and the like. The server 40 may be composed of a plurality of computers.

The communication interface 41 has an interface circuit for connecting the server 40 to a communication network 60. The server 40 communicates with the outside of the server 40, for example, a plurality of vehicles 50, via the communication network 60. Communication interface 41 is an example of a communication unit of the server 40.

The storage device 42 includes, for example, a hard disk drive (HDD), a solid-state drive (SDD), or an optical recording medium and its accessing device. The storage device 42 stores various kinds of data, for example, map information, information of a plurality of vehicles 50 (identification information, position information, and the like), and a computer program for the processor 44 to execute various kinds of processing. Storage device 42 is one example of a storage portion of server 40.

The memory 43 includes a nonvolatile semiconductor memory such as RAM. The memory 43 temporarily stores, for example, various data used when various processing is executed by the processor 44. Memory 43 is another example of a storage portion of server 40.

The processor 44 includes one or a plurality of CPUs and peripheral circuits thereof, and executes various processes. The processor 44 may further include other arithmetic circuits such as a logical arithmetic unit, a numerical arithmetic unit, or a graphic processing unit.

In the third embodiment, the server 40 functions as the information presentation device instead of ECU 10, and the processor 44 of the server 40 includes the peripheral information acquiring unit 15, the effect index calculating unit 16, and the output control unit 17. The peripheral information acquiring unit 15, the effect index calculating unit 16, and the output control unit 17 are functional modules realized by the processor 44 of the server 40 executing computer programs stored in the storage device 42 of the server 40.

Figure 12:
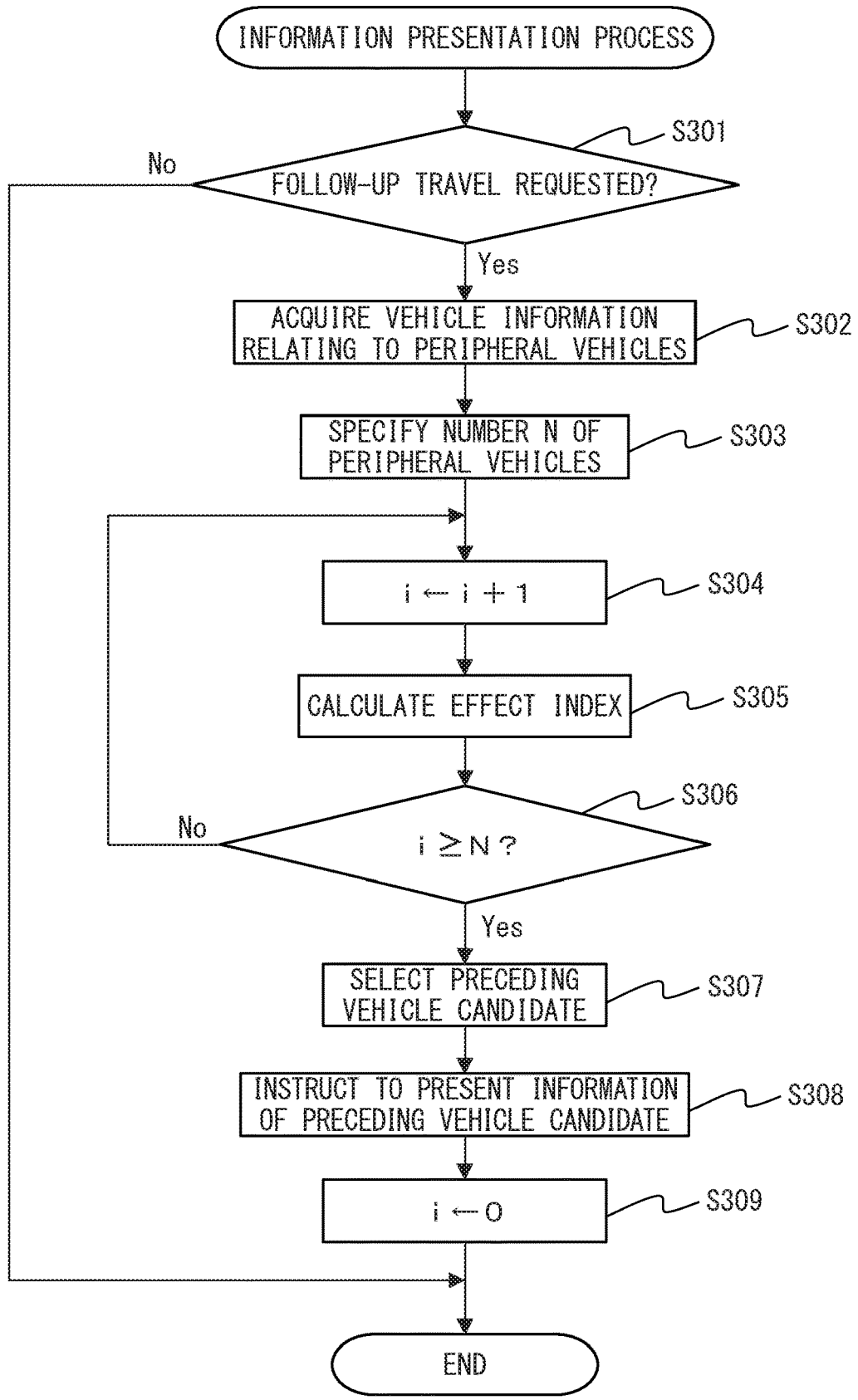
FIG. 12 is a flowchart showing a control routine of the information presentation process in the third embodiment.

FIG. 12 is a flowchart showing a control routine of the information presentation process in the third embodiment. The control routine is repeatedly executed at predetermined execution intervals by the processor 44 of the server 40.

First, in step S301, the output control unit 17 determines whether the follow-up travel from any of the vehicles 50 of the plurality of vehicles 50 is requested. For example, when an occupant of the vehicle 50 requests the actuation of the ACC or the start of the follow-up travel via HMI 8, a request signal for the follow-up travel is transmitted from the vehicle 50 to the server 40. If it is determined in step S301 that follow-up travel is not requested, the control routine ends.

On the other hand, if it is determined in step S301 that follow-up travel is requested, the control routine proceeds to step S302. In this case, in the following processing steps, the vehicle 50 that has requested the follow-up travel is recognized as the own vehicle. Then, in step S302, the peripheral information acquiring unit 15 acquires vehicle information relating to a plurality of peripheral vehicles located in a predetermined range around the own vehicle (e.g., a range in which the vehicle-to-vehicle distance between peripheral vehicles and the own vehicle is equal to or less than a predetermined value). Specifically, the peripheral information acquiring unit 15 acquires the vehicle information via the wide area communication from each of the plurality of peripheral vehicles located within a predetermined range around the own vehicle. As in the first embodiment, as the vehicle information relating to the peripheral vehicle, the position of the peripheral vehicle, the vehicle width and the vehicle length of the peripheral vehicle or the like is transmitted from the peripheral vehicle to the server 40.

Next, in step S303, the effect index calculating unit 16 specifies the number N of peripheral vehicles in which the vehicle information is acquired by the peripheral information acquiring unit 15, and assigns the vehicle number (1 to N) to each of the N peripheral vehicles.

Next, in step S304, the effect index calculating unit 16 updates the vehicle number i by adding 1 to the vehicle number i. The initial value of the vehicle number i is zero.

Then, in step S305, similarly to the step S105 of FIG. 4, the effect index calculating unit 16 calculates the effect index relating to the i-th peripheral vehicle based on the vehicle information relating to the i-th peripheral vehicle.

Next, in step S306, the effect index calculating unit 16 determines whether or not the vehicle number i is equal to or greater than N. If it is determined that the vehicle number i is less than N, the control routine returns to step S304, and steps S304 and S305 are performed again to calculate the effect index for another peripheral vehicle.

On the other hand, if it is determined in step S306 that the vehicle number i is equal to or greater than N, the control routine proceeds to step S307. In step S307, the output control unit 17 selects the peripheral vehicle having the highest effect index, that is, the peripheral vehicle having the largest reduction degree of the air resistance acting on the own vehicle, as the preceding vehicle candidate. As in the first embodiment, the output control unit 17 may select the preceding vehicle candidate based on other determination criteria.

Next, in step S308, the output control unit 17 transmits the information of the preceding vehicle candidate to the own vehicle via the wide area communication, and instructs the own vehicle (specifically, ECU 10) to present the information of the preceding vehicle candidate. As a consequence, the position information and the effect index for the preceding vehicle candidate are outputted from HMI 8 of the own vehicle. Therefore, the output control unit 17 causes the HMI 8 of the own vehicle to output the position information and the effect index relating to the preceding vehicle candidate through ECU 10 of the own vehicle.

Then, in step S309, the output control unit 17 resets the vehicle number i to zero. After step S309, the control routine ends. Incidentally, the calculation for calculating the effect index for each of the plurality of peripheral vehicles, i.e. the processing of step S305 may be performed in parallel. Further, if the own vehicle requesting the follow-up travel acquires vehicle information relating to a plurality of peripheral vehicles around the own vehicle, the vehicle information relating to a plurality of peripheral vehicles may be transmitted to the server 40 from the own vehicle via the wide area communication. In this case, in step S302, the peripheral information acquiring unit 15 acquires the vehicle information relating to the plurality of peripheral vehicles from the own vehicle through the wide area communication.

While preferred embodiments of the present disclosure have been described above, the present disclosure is not limited to these embodiments, and various modifications and changes may be made within the scope of the appended claims. For example, the vehicle in which the vehicle control system 1 is provided may be a manually operated vehicle having no driving support function. Further, the output control unit 17 may cause HMI 8 to output the position information and the effect index relating to all peripheral vehicles in which the vehicle information is acquired by the peripheral information acquiring unit 15.

A computer program that causes the computer to realize the functions of each unit of the processor 13 of ECU 10 or the processor 44 of the server 40 may be provided in a form stored on a computer readable recording medium. The computer readable recording medium is, for example, a magnetic recording medium, an optical recording medium, or a semiconductor memory.

In addition, the above-described embodiments can be optionally combined and implemented. For example, when the second embodiment and the third embodiment are combined, steps S207 and S208 of FIG. 8 are executed in place of step S307 in the control routine of FIG. 12, and in step S308, the output control unit 17 transmits information of a plurality of preceding vehicle candidates to the own vehicle via wide area communication, and instructs the own vehicle (specifically, ECU 10) to display information of the plurality of preceding vehicle candidates. As a result, the position information, the effect index, and the priorities of a plurality of preceding vehicle candidates are displayed from HMI 8 of the vehicle. Therefore, the output control unit 17 causes the HMI 8 of the own vehicle to display the position information, the effect index, and the priority regarding a plurality of preceding vehicle candidates through ECU 10 of the own vehicle.

DESCRIPTION OF SYMBOLS

8 Human machine interface (HMI)
10 Electronic control unit ECU)
13 Processor
15 Peripheral information acquiring unit
16 Effect index calculating unit
17 Output control unit
20 Own vehicle
30 Peripheral vehicle

The invention claimed is:

1. An information presentation device for presenting information for selecting a preceding vehicle as a tracking target of an own vehicle via an output device provided in the own vehicle, the information presentation device comprising:
a processor configured to (i) acquire vehicle information about each individual one of a plurality of peripheral vehicles around the own vehicle, (ii) calculate, for each individual one of the plurality of peripheral vehicles, an effect index representing an effect due to follow-up travel of traveling behind each individual one of the plurality of peripheral vehicles based on only the vehicle information acquired for each individual one of the plurality of peripheral vehicles, and (iii) cause the output device to output position information and the effect index relating to individual peripheral vehicles of at least a portion of the plurality of peripheral vehicles.

2. The information presentation device according to claim 1, wherein the effect index is, for each individual one of the plurality of peripheral vehicles, a reduction degree of an air-resistance acting on the own vehicle by the own vehicle traveling directly behind each individual one of the plurality of peripheral vehicles.

3. The information presentation device according to claim 1, wherein the effect index is, for each individual one of the plurality of peripheral vehicles, a reduction degree of fuel consumption or power consumption in the own vehicle by the own vehicle traveling directly behind each individual one of the plurality of peripheral vehicles.

4. The information presentation device according to claim 1, wherein the processor is further configured to (a) select one preceding vehicle candidate from the plurality of peripheral vehicles, and (b) cause the output device to output the position information and the effect index relating to the preceding vehicle candidate.

5. The information presentation device according to claim 4, wherein the processor is configured to select, among the plurality of peripheral vehicles, a peripheral vehicle having a highest effect index as the preceding vehicle candidate.

6. The information presentation device according to claim 4, wherein the processor is configured to cause the output device to display the preceding vehicle candidate so that the preceding vehicle candidate is emphasized more than other ones of the plurality of peripheral vehicles on the output device.

7. The information presentation device according to claim 1, wherein the processor is further configured to (a) select a plurality of preceding vehicle candidates from among the plurality of peripheral vehicles, (b) determine priorities of the plurality of preceding vehicle candidates, and (c) cause the output device to display the position information, the effect index, and the priority relating to each of the plurality of preceding vehicle candidates.

8. The information presentation device according to claim 7, wherein the processor is configured to determine the priorities of the plurality of preceding vehicle candidates so that the priority is higher as the effect index is higher.

9. The information presentation device according to claim 4, wherein the processor is configured to cause the output device to output information for supporting a lane change by the own vehicle to a lane in which the preceding vehicle candidate is located.

10. The information presentation device according to claim 9, wherein the information for supporting the lane change includes information of a rear vehicle positioned rearward of the own vehicle in a lane after execution of the lane change.

11. An information presenting method executed by a computer, the method including:
acquiring vehicle information about each individual one of a plurality of peripheral vehicles around an own vehicle;
calculating, for each individual one of the plurality of peripheral vehicles, an effect index representing an effect due to follow-up travel of traveling behind each individual one of the plurality of peripheral vehicles based on only the vehicle information acquired for each individual one of the plurality of peripheral vehicles; and
causing an output device provided in the own vehicle to output position information and the effect index relating to individual peripheral vehicles of at least a portion of the plurality of peripheral vehicles.

12. A non-transitory recording medium having recorded thereon a computer program for presenting information for selecting a preceding vehicle as a tracking target of an own vehicle via an output device provided in the own vehicle, the computer program causing a computer to:
acquire vehicle information about each individual one of a plurality of peripheral vehicles around the own vehicle,
calculate, for each individual one of the plurality of peripheral vehicles, an effect index representing an effect due to follow-up travel of traveling behind each individual one of the plurality of peripheral vehicles based on only the vehicle information acquired for each individual one of the plurality of peripheral vehicles, and
cause the output device to output position information and the effect index relating to individual peripheral vehicles of at least a portion of the plurality of peripheral vehicles.

* * * * *